(No Model.)
G. H. LITTLE.
AGRICULTURAL MACHINE.
No. 412,638. Patented Oct. 8, 1889.
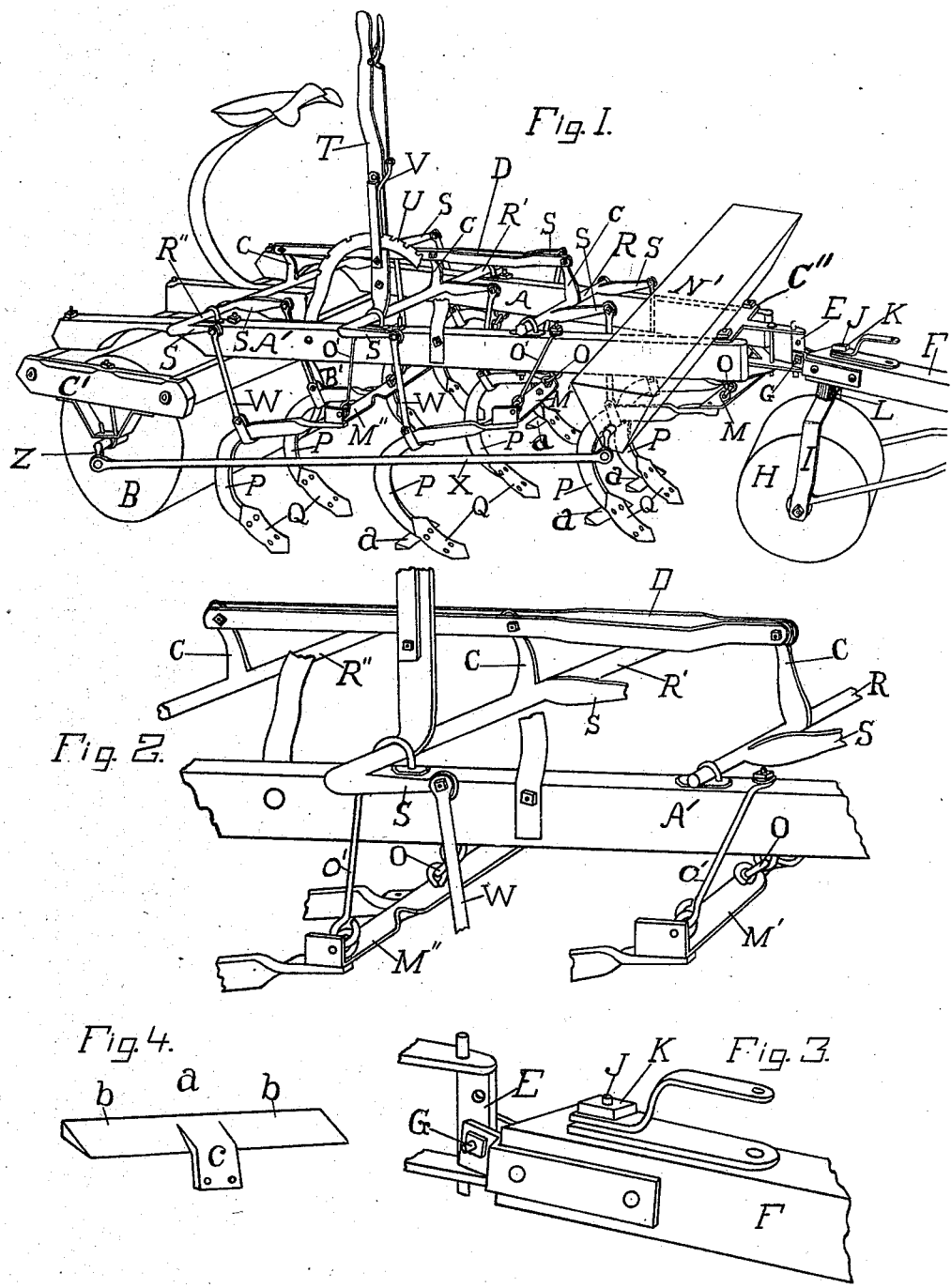
Witnesses
Inventor
George H. Little
by Hazard & Townsend
his Attys

UNITED STATES PATENT OFFICE.

GEORGE H. LITTLE, OF LOS ANGELES, CALIFORNIA.

AGRICULTURAL MACHINE.

SPECIFICATION forming part of Letters Patent No. 412,638, dated October 8, 1889.

Application filed January 8, 1889. Serial No. 295,786. (No model.)

*To all whom it may concern:*

Be it known that I, GEORGE H. LITTLE, a citizen of the United States, residing at Los Angeles, in the county of Los Angeles and State of California, have invented a new and useful Improvement in Agricultural Machines, and capable of being used for various purposes, of which the following is a full, clear, and exact specification.

The nature of my invention, concisely stated, consists in the peculiar arrangement and combination of the several component elements of an agricultural machine which is adapted to perform the functions of a cultivator, a seeder, a weed-cutter, and a clod-crusher, said combination rendering the machine cheaper of cost and capable of use with greater ease and facility, as hereinafter more fully described.

In the accompanying drawings, Figure 1 represents a perspective view of my machine. Figs. 2 and 3 represent in perspective detached portions thereof, and Fig. 4 represents a perspective view of the removable weed-cutter.

The main frame A A' increases in width from front to rear, as shown in Fig. 1, is secured together at the front by means of bolts and iron frame C'', and is mounted and supported by short roller H at its front end and upon frame C' of the rear rollers B B'. (The latter, which is the left-hand independent half of the rear roller, is not shown in the drawings.)

I employ three sets of cultivator-blades Q, arranged with two in the front set, with three in the middle set, and with four in the rear set, as shown in Fig. 1. These blades are secured to the curved shanks P, which are bolted to hinge-bars M, and the bars M are in their turn supported transversely under the frame by the connecting rods and links O O', forming a hinge upon which they are free to move with the cultivator shanks and blades as the latter are elevated or depressed.

For the purpose of simultaneous vertical adjustment of the shanks and blades P Q, I have organized a system of transverse rock-shafts R R' R'', having, respectively, the number of radial arms S to correspond with the number of blade-shanks of the respective sets of cultivator-blades Q. Said rock-shafts are provided each with an arm or lever C, standing upright and at right angles to the arms S. Said arms C are connected together by being pivoted to the longitudinal bar D. The rock-shaft arms S are connected with the shanks P by means of stirrups and pivoted connecting-rods W respectively. To the central transverse rock-shaft R' the hand-lever T is rigidly secured, having a spring-catch working in the curved notched bar U. It will now be readily seen that the forward or backward movement of lever T will cause, through the connections described uniting the rock-shafts with the cultivator blades or shanks, a simultaneous raising or lowering of the blades, as the case may be.

The iron frame C'' is provided with a hinge-plate E, and the tongue F is hinged or pivoted to said plate E adjustably, and by these means the tongue will be free to move vertically and laterally.

The tongue F is mounted above the short roller H and connected thereto by the upright bolt J and yoke or bracket I, between the arms of which said roller H is journaled. The main frame is supported at the rear end of the tongue by means of plate E and hinge-pivot G and may be vertically adjusted thereby, and further vertical adjustment may be made by placing the removable collar L upon the bolt J above instead of below the tongue F, which change will cause the tongue to rest directly upon the yoke I. This capability of the vertical adjustment of the front end of the main frame, together with the adjustment of the cultivator-blades by means of lever T, will adapt the machine to the various uses for which it is intended.

The removable weed-cutter *a* may be attached so as to occupy a nearly-horizontal position, and be used with or without the blades Q, for the purpose of cutting off and pulling out weeds and grass. Different forms of attachable tools for this and similar purposes may be substituted for the blades Q—as, for instance, the marking off of garden-lands for planting or for raking or harrowing. It may be proper to observe that the length of the transverse hinged bars M M' M'', also of the rock-shaft R R' R'', correspond with the width of the main frame A A' at the respective locations.

The seed-box N' is located upon the front end of the frame, and the seed is agitated in the usual manner for distribution over the ground by means of the pitman X, which is operated by crank Z on the end of the journal of roller B.

In the operations of this machine its draft will be comparatively light, considering the fact that it is supported upon the three rollers H B B', and performs the work as a simple cultivator of breaking up the ground and of crushing the clods at the same time. Besides, the cultivator-blades or substitutes therefor will be kept in uniform depth in the soil by virtue of the weight of the machine and its supporting-rollers, which advantages would not be attained if the machine were supported by ordinary carrying-wheels.

The depth to which the blades Q may be made to work below the surface of the ground can be varied to any degree by the use of the system of shafts and levers and their connections operated and fixed by means of lever T, its catch V, and the fixed curved notched bar U, into which catch V works to hold the shanks P and blades Q in a uniform plane of greater or less elevation.

It will be understood that a machine organized like mine, in which nine cultivator-blades are employed, spreading laterally under the widened frame and jointly adjustable to regulate their operation, cannot work uniformly to the same depth in the soil if the machine is carried upon wheels, as is the general manner, because the inequalities of the ground and lumps of earth will cause lateral oscillations, raising some of the blades out of the soil and causing others at the opposite side of the machine to work unnecessarily deep in the soil; but when supported on rollers extending across below the frame at front and rear of the set of cultivator-blades uniformity of depth of cultivation is assured.

Having fully described my invention, I claim as an improvement in cultivators—

1. In an agricultural machine, the combination of the frame A A', the roller-frame C', and the auxiliary frame or hinge-plates C'', with the truck-frame consisting of the tongue E, hinged to the main frame, the yoke I J, and the roller H, substantially as shown and described.

2. The combination of the main frame A A', rollers B B', and frame C', the auxiliary frame C'', the adjusting hinge-plate E, the tongue F, yoke I J, roller H, and adjusting-collar L, substantially as shown and described.

3. The main frame, the series of armed rock-shafts R R' R'', the bar D, and lever T, in combination with the cross or hinge bars M, suspended from the frame by the links O', the shanks P, for the cultivator-teeth, pivoted to the hinge-bars, and the rods W, connecting the shanks to the arms of the rock-shafts, substantially as shown and described.

GEORGE H. LITTLE.

Witnesses:
JAMES R. TOWNSEND,
M. C. GALER.